(12) United States Patent
Fluhrer et al.

(10) Patent No.: US 8,036,221 B2
(45) Date of Patent: Oct. 11, 2011

(54) METHOD AND SYSTEM FOR DYNAMIC SECURED GROUP COMMUNICATION

(75) Inventors: Scott Fluhrer, North Attleboro, MA (US); Warren Scott Wainner, Sterling, VA (US); Sheela Rowles, Cupertino, CA (US); Kavitha Kamarthy, Milpitas, CA (US); Mohamed Khalid, Cary, NC (US); Haseeb Naizi, Morrisville, NC (US); Pratima Sethi, Maharashtra (IN)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 12/210,821

(22) Filed: Sep. 15, 2008

(65) Prior Publication Data

US 2009/0034557 A1    Feb. 5, 2009

Related U.S. Application Data

(63) Continuation-in-part of application No. 10/867,266, filed on Jun. 14, 2004, now Pat. No. 7,509,491.

(51) Int. Cl.
*H04L 12/56* (2006.01)

(52) U.S. Cl. .......................... 370/392; 370/473; 370/474

(58) Field of Classification Search .................. 370/389, 370/392, 393, 396, 397, 400, 409, 471, 473, 370/474, 475, 476
See application file for complete search history.

(56) References Cited

U.S. PATENT DOCUMENTS

| | | | |
|---|---|---|---|
| 6,038,322 A | 3/2000 | Harkins | |
| 6,215,878 B1 | 4/2001 | Harkins | |
| 6,484,257 B1 | 11/2002 | Ellis | |
| 6,590,885 B1 | 7/2003 | Jorgensen | |
| 6,611,872 B1 | 8/2003 | McCanne | |
| 6,678,828 B1 | 1/2004 | Pham et al. | |
| 6,680,922 B1 | 1/2004 | Jorgensen | |
| 6,789,118 B1 | 9/2004 | Rao | |
| 6,798,782 B1 | 9/2004 | Caronni et al. | |
| 6,826,616 B2 | 11/2004 | Larson et al. | |
| 6,839,346 B1 * | 1/2005 | Kametani | 370/389 |
| 6,839,759 B2 | 1/2005 | Larson et al. | |
| 2002/0010866 A1 * | 1/2002 | McCullough et al. | 713/201 |
| 2002/0136223 A1 | 9/2002 | Ho | |
| 2002/0188871 A1 | 12/2002 | Noehring et al. | |
| 2003/0053464 A1 * | 3/2003 | Chen et al. | 370/400 |
| 2003/0108041 A1 * | 6/2003 | Aysan et al. | 370/389 |
| 2003/0188159 A1 | 10/2003 | Josset et al. | |
| 2004/0001508 A1 * | 1/2004 | Zheng et al. | 370/466 |

OTHER PUBLICATIONS

Derfler, Frank J., Jr. and Freed, Les, How Networks Work, Sep. 2000, Que Corporation, pp. 188-189.

* cited by examiner

*Primary Examiner* — Ricky Ngo
*Assistant Examiner* — Wei-Po Kao

(57) ABSTRACT

A system and method directed to carrying out dynamic secured group communication is provided. The method includes obtaining a first packet that includes a first header. The first header includes a first source address of a first source node of a first network, and a first destination address of a first destination node of the first network. The method also includes forming a frame that includes the first header in encrypted form, combining the first header and the frame to form a second packet, and forming a second header. This second header includes a second source address of a second source node of a second network, and a second destination address of a second destination node of the second network. The method further includes encapsulating the second packet with the second header to form a third packet, and communicating the third packet into the second network from the second source node for termination to the second-destination node.

23 Claims, 8 Drawing Sheets

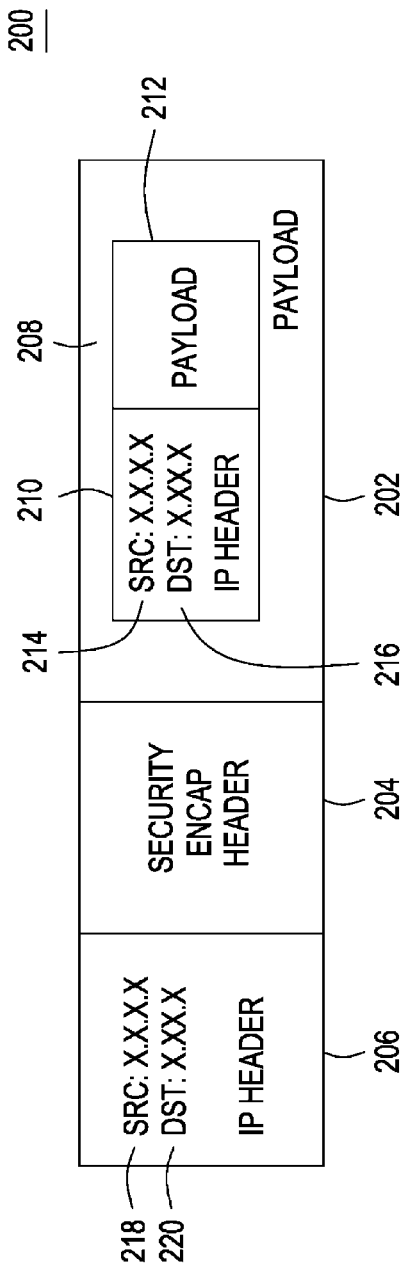
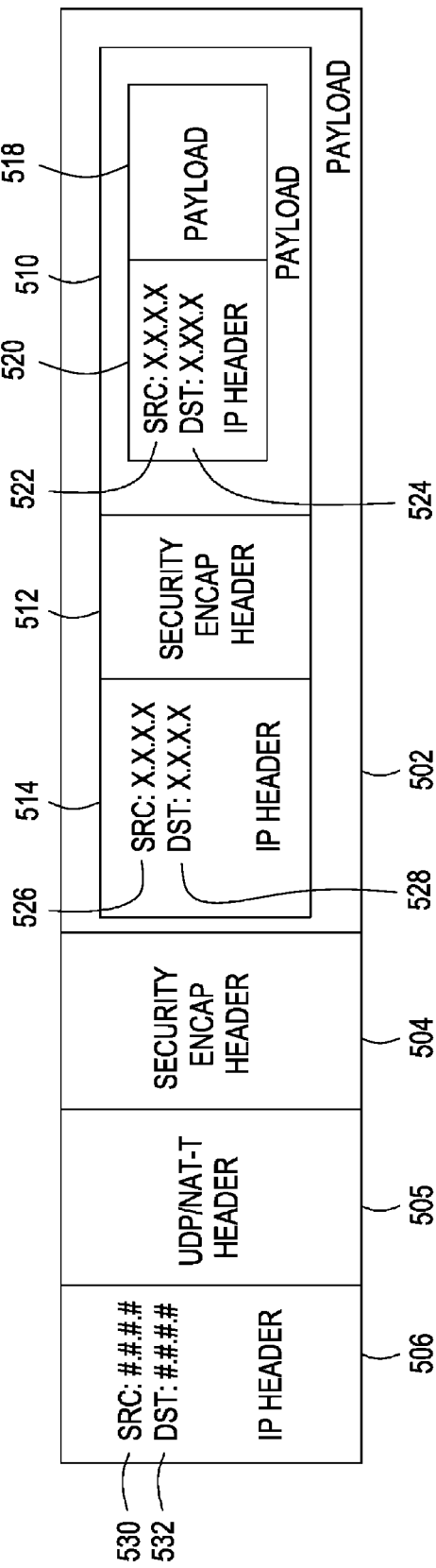

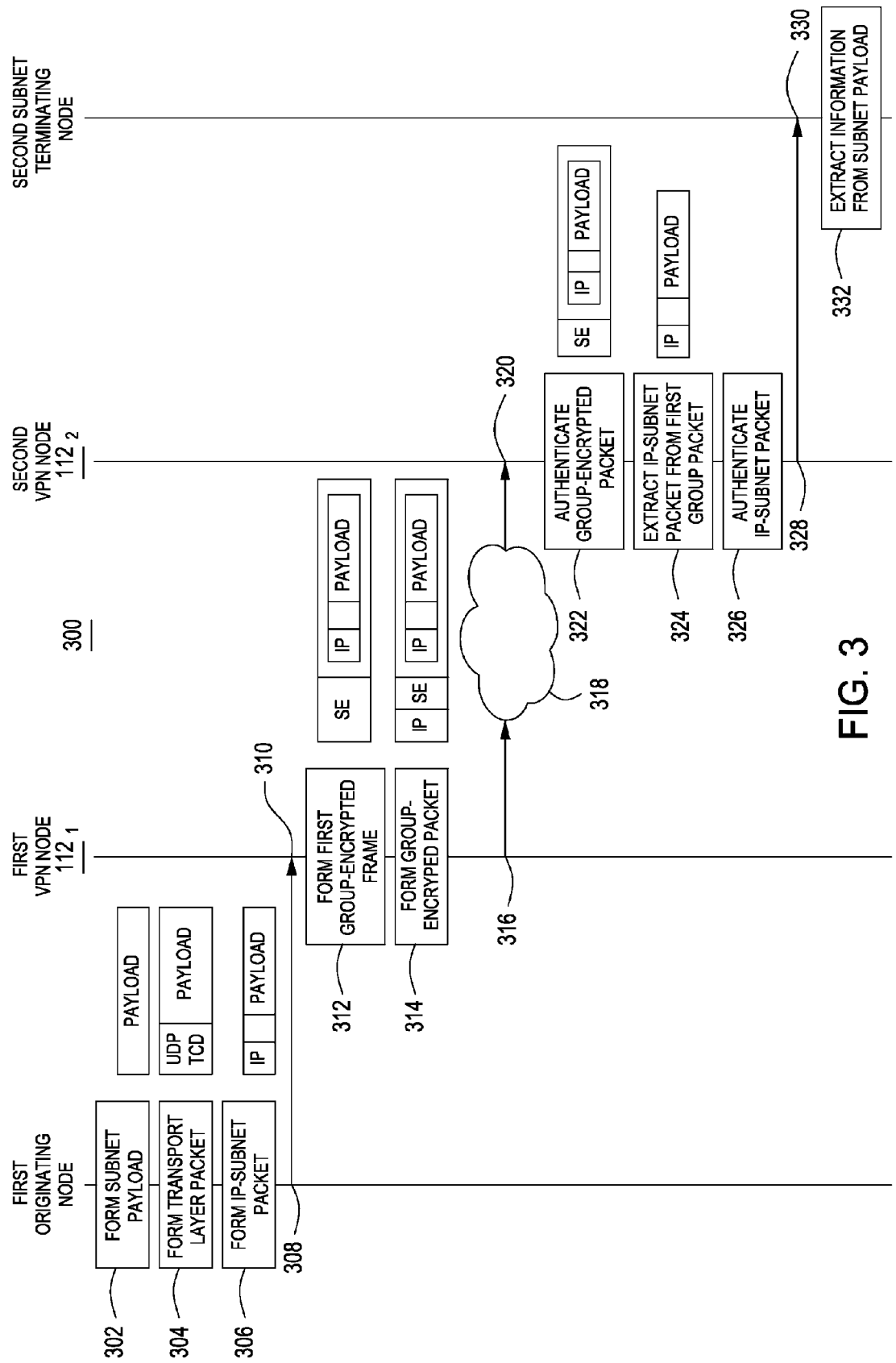

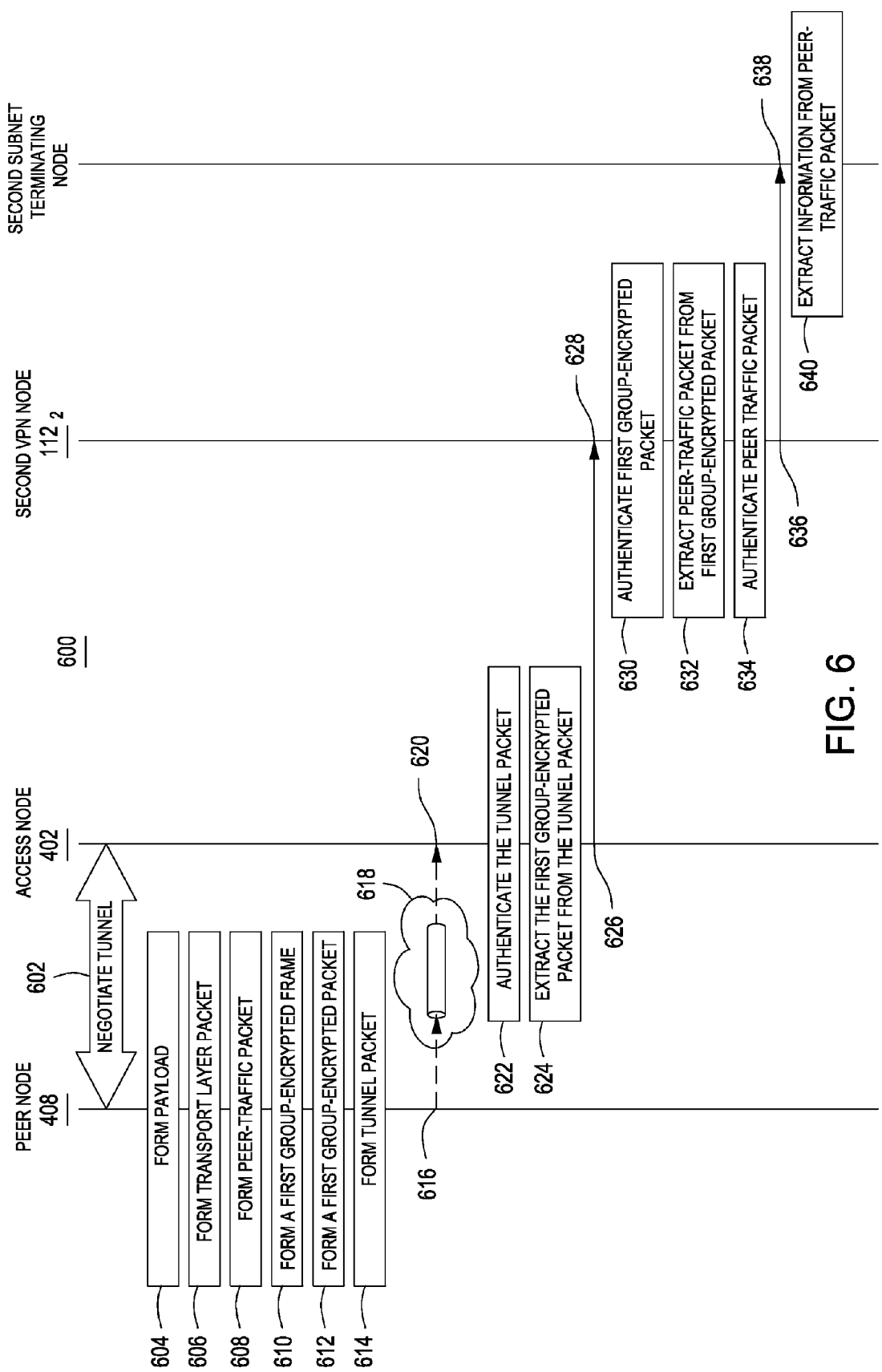

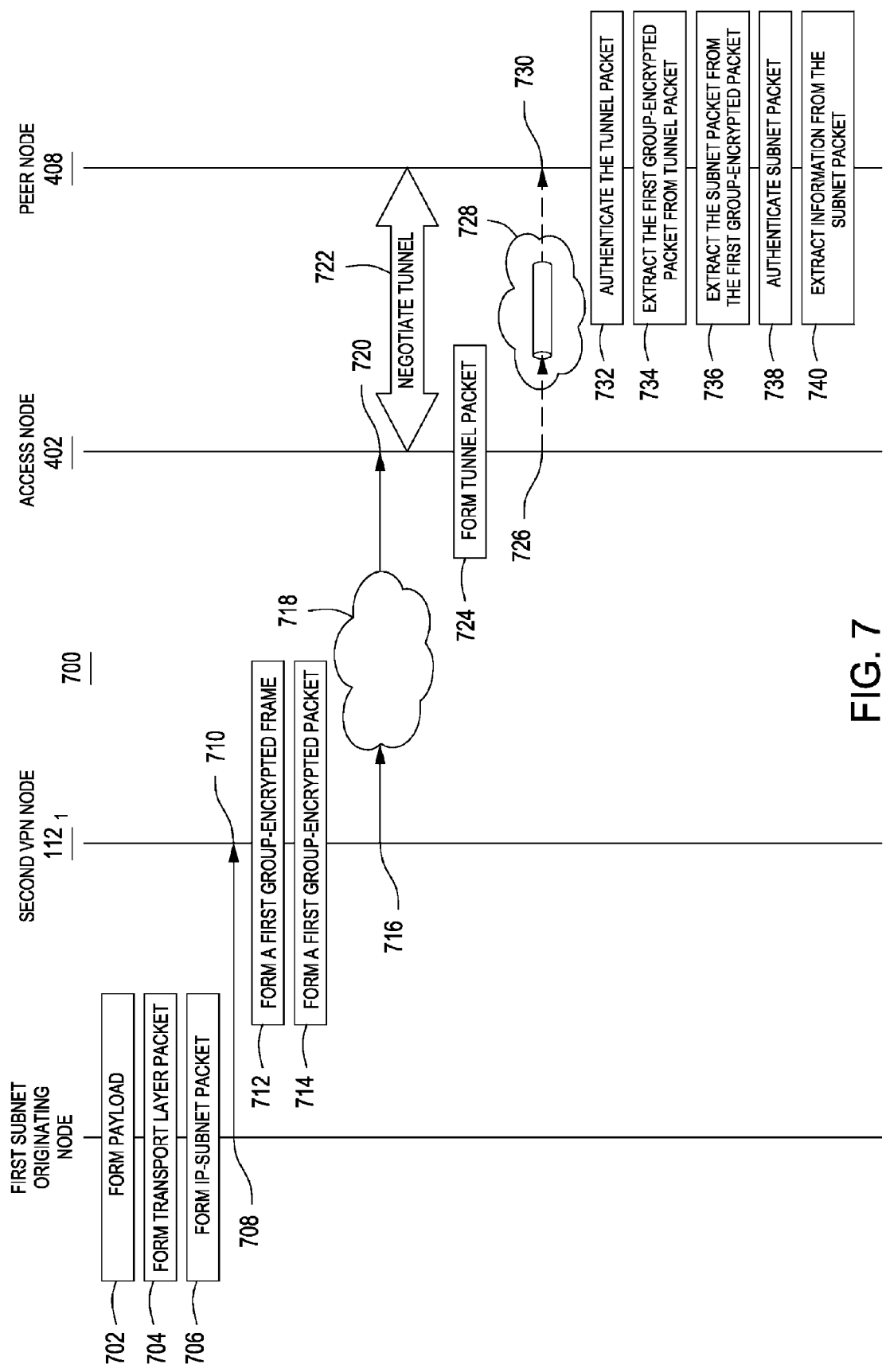

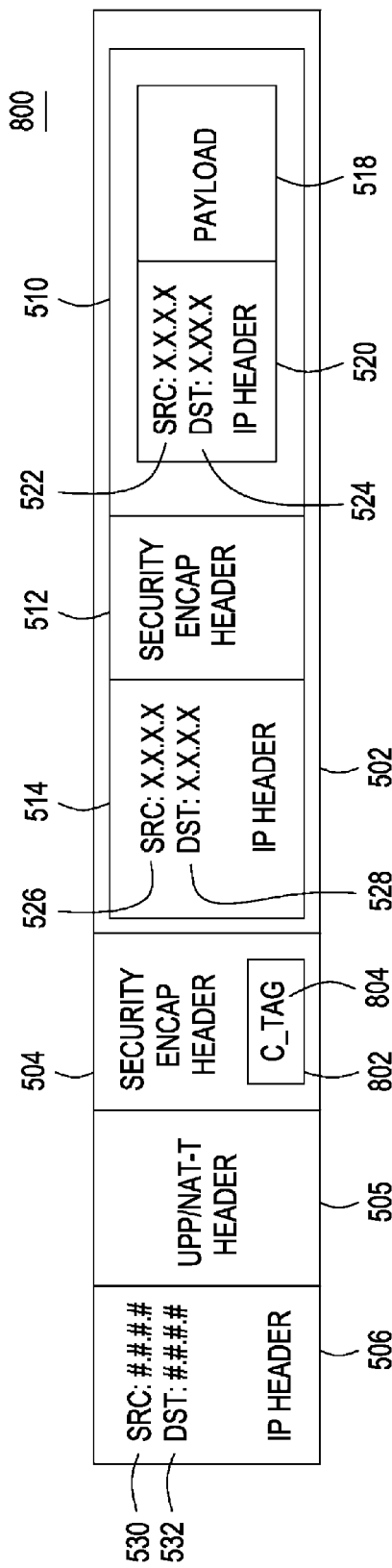
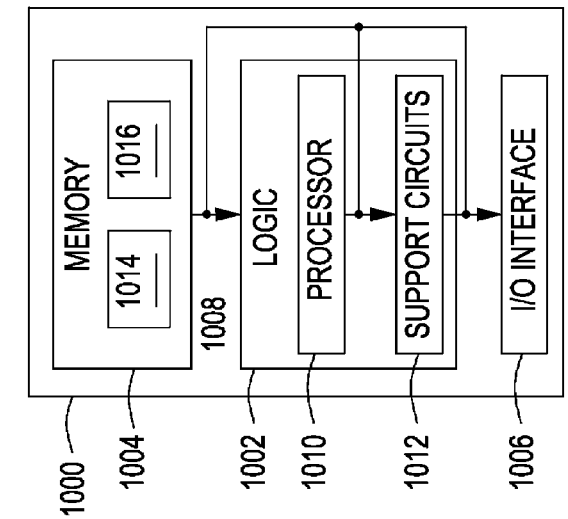
FIG. 8
FIG. 10

METHOD AND SYSTEM FOR DYNAMIC SECURED GROUP COMMUNICATION

CROSS-REFERENCE TO RELATED APPLICATIONS

This application is a continuation-in-part application of co-pending U.S. patent application Ser. No. 10/867,266, filed 14 Jun. 2004, which is incorporated herein by reference.

BACKGROUND

1. Field

The present invention relates to communication and/or computer networks, and more particularly to Virtual Private Networks.

2. Related Art

A physical network, such as a service provider network topology, may include a large number of nodes. These nodes may include peripherally located provider edge routers, each of which couples to one or multiple customer edge routers. The customer edge routers, in turn, may couple to private local area networks associated with one or multiple customers. Typically, the service provider network selectively couples the local area networks to each other through links created between its provider edge routers.

A Virtual Private Network ("VPN") enables a secure exchange of certain traffic between nodes of the physical network without having to dedicate such nodes to only carrying out the secure exchange. The VPN enables such secure exchange by encrypting the certain traffic ("secured traffic") to protect against eavesdropping and tampering by unauthorized parties. Because resources of the network are shared between the secured traffic and un-secured traffic, costs of using the resources are generally reduced for each of many users of the network.

SUMMARY

A system and method directed to carrying out dynamic secured group communication is provided. The method includes obtaining a first packet that includes a first header. The first header includes a first source address of a first source node of a first network, and a first destination address of a first destination node of the first network. The method also includes forming a frame that includes the first header in encrypted form, combining the first header and the frame to form a second packet, and forming a second header. This second header includes a second source address of a second source node of a second network, and a second destination address of a second destination node of the second network. The method further includes encapsulating the second packet with the second header to form a third packet, and communicating the third packet into the second network from the second-source node for termination to the second-destination node.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein:

FIG. 2 is a block diagram illustrating a first structure of a communication packet for carrying out a dynamic secured group communication;

FIG. 3 is a flow diagram illustrating a first example communication flow for carrying out a dynamic secured group communication;

FIG. 5 is a block diagram illustrating a second example structure of a communication packet for carrying out a dynamic secured group communication;

FIG. 6 is a flow diagram illustrating a second example communication flow for carrying out a dynamic secured group communication is shown;

FIG. 7 is a flow diagram illustrating a third example communication flow for carrying out a dynamic secured group communication;

FIG. 8 is a block diagram illustrating a tunnel packet formed in accordance with the authentication protocol;

FIG. 10 is a block diagram illustrating an example network node for use with carrying out a dynamic secured group communication.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for exemplary purposes only and other embodiments and/or examples may be employed in lieu of or in combination with of the embodiments disclosed. As summarized above and described in more detail below, a method and system for dynamic secured group communication is provided.

Example Architecture

Figure 1:
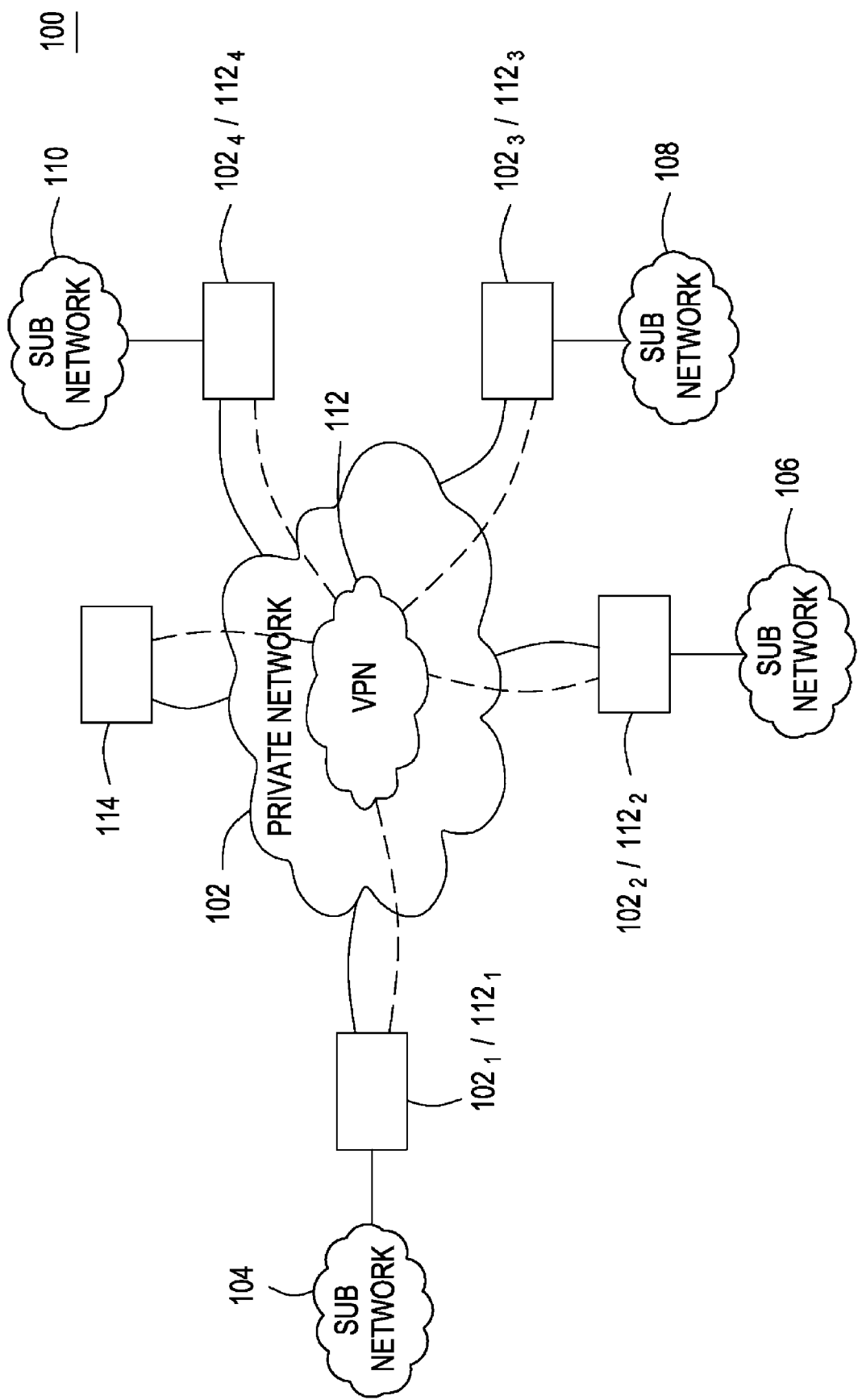
FIG. 1 is a block diagram illustrating a first example network architecture for carrying out a dynamic secured group communication.

FIG. 1 is a block diagram illustrating example network architecture 100 for carrying out a dynamic secured group communication. The network architecture 100 includes a non-publicly accessible ("private") network 102; four sub-networks ("subnets"), namely, a first subnet 104, a second subnet 106, a third subnet 108 and a fourth subnet 110; and a virtual private network ("VPN") 112. The private network 102 may be, for example, an enterprise or service-provider managed wide-area network ("WAN") that is adapted to interconnect the first, second, third and fourth subnets 104-110, which may be local-area networks ("LANs") residing at respective enterprise installations.

Typically, the private network 102 includes a large number of network nodes; most of which are not shown for simplicity of exposition. As shown, the private network 102 includes four network nodes, namely, a first node $102_1$, a second node $102_2$, a third node $102_3$ and a fourth node $102_4$. The first, second, third and fourth nodes $102_1$, $102_2$, $102_3$ and $102_4$ (or referred to herein collectively as "network nodes $102_1$-$102_4$") communicatively couple to the private network 102 and to the first, second, third and fourth subnets 104, 106, 108 and 110, respectively. The network nodes $102_1$-$102_4$ may, for example, be embodied as and/or function as routers or, alternatively, gateways (collectively "routers").

In general, the network nodes $102_1$-$102_4$ route, transit or otherwise transport (collectively "route") to the respective subnets 104-110 and/or forward traffic obtained from the private network 102 ("network traffic"). In addition, the network nodes $102_1$-$102_4$ route to the private network 102 traffic obtained from their respective subnets 104-110 (collectively "subnet traffic").

The VPN 112, because it is partitioned from resources of, formed over, established within or via, etc. the private network 102, may utilize some or all of the network nodes of the private network 102 as nodes ("VPN nodes"). For simplicity of exposition, however, the first, second, third and fourth nodes $102_1$-$102_4$ double as first, second, third and fourth VPN nodes $112_1$-$112_4$, respectively.

The network architecture 100 also includes a security-management node 114 that communicatively couples to the private network 102. The security-management node 114 may manage, administer and/or assist in establishing and/or maintaining the VPN 112.

The VPN 112 may, for example, function, operate and/or behave in accordance with descriptions and/or teachings provided in the above-incorporated, co-pending U.S. patent application Ser. No. 10/867,266, filed 14 Jun. 2004. Alternatively and/or additionally, the VPN 112 may function, operate and/or behave in accordance with descriptions and/or teachings provided in (i) *Cisco Group Encrypted Transport VPN* (*Cisco IOS Security Configuration Guide*), Cisco Systems, Inc. Nov. 17, 2006, (ii) *Cisco Group Encrypted Transport VPN Data Sheet and/or Technical Overview*, Cisco Systems, Inc., December 2006, all of which are incorporated herein by reference. In addition, the VPN 112 may include elements set forth in the above-incorporated descriptions and teachings that are not shown in FIG. 1.

In accordance with the above-incorporated descriptions and teachings, the security-management node 114 includes information for configuring and/or provisioning the network nodes $102_1$-$102_4$ to function as the VPN nodes $112_1$-$112_4$. This information ("VPN information") may include a security policy for the VPN 112 ("VPN security policy").

The VPN security policy may define one or more security policies for cryptographically securing one or more groups of subnet traffic, respectively, in accordance with group domain of interpretation ("GDOI") as set forth in IETF RFC 3547 and above-incorporated descriptions and teachings. These security policies ("group-security polices") may include, for example, first and second group-security policies.

The first group-security policy may include a first cipher (or first set of ciphers) for cryptographically securing a first group of the subnet traffic ("first group traffic"). The second group-security policy may include a second cipher (or second set of ciphers) for cryptographically securing a second group of the subnet traffic ("second group traffic"). The security-management node 114 may be adapted to dynamically adjust the VPN security policy to include additional or to fewer group-security polices responsive to a need for cryptographically securing more or fewer groups of the subnet traffic.

The security-management node 114 generally provides the VPN information to the network nodes $102_1$-$102_4$ by way of a negotiation with or registration of the network nodes $102_1$-$102_4$. The negotiation may include the security-management node 114 receiving from the network nodes $102_1$-$102_4$ respective requests for the VPN information, and obtaining from the network nodes $102_1$-$102_4$ valid security credentials. Alternatively, the negotiation may include the security-management node 114 providing the VPN information to the network nodes $102_1$-$102_4$ without receiving the requests and/or obtaining the valid security credentials.

The VPN nodes $112_1$-$112_4$, responsive to obtaining the VPN information, may configure, provision and/or otherwise cause themselves to form a number of different groups. These different groups may include (i) a first group having a number of members ("first group members") for cryptographically securing the first group traffic and for routing such traffic in the VPN 112; and (ii) a second group having a number of members ("second group members") for cryptographically securing the second group traffic and for routing such traffic in the VPN 112. The first group members may include, for example, the first, second and third VPN nodes $112_1$-$112_3$, and the first group traffic may include the subnet traffic that the first, second and third VPN nodes $112_1$-$112_3$ exchange. The second group members may include, for example, the first and fourth VPN nodes $112_1$, $112_4$, and the second group traffic may include the subnet traffic that the first and fourth and fourth VPN nodes $112_1$, $112_4$ exchange.

To facilitate cryptographically securing the first group traffic, each of the first group members (VPN nodes $112_1$-$112_4$) forms respective first group-encrypted traffic. To form the first group-encrypted traffic, each of the first group members encrypts its first group traffic using the first cipher and encapsulates such traffic with a first group-security association formed in accordance with the first group-security policy. This way, only the first group members can decipher the first group-encrypted traffic.

Analogously, each of the second-group members (VPN nodes $112_1$ and $112_4$) forms respective second group-encrypted traffic. To form the second group-encrypted traffic, each of the second group members encrypts its second group traffic using the second cipher and encapsulates this traffic with a second group-security association formed in accordance with the second group-security policy. This way, only the second group members can decipher the second group-encrypted traffic.

In addition to cryptographically securing and routing the first-group traffic, each of the first group members may forward the second group-encrypted traffic routed by any of the second group members. Analogously, each of the second group members may forward the first group-encrypted traffic routed by any of the first group members. To facilitate this, the first-group members and second-group members may use a given communication packet structure, such as shown in FIG. 2.

Referring now to FIG. 2, a block diagram illustrating a structure of a communication packet 200 for carrying out a dynamic secured group communication is shown. For convenience, the structure of the communication packet 200 is described with reference to the example network architecture 100 of FIG. 1, and in particular to communicating the first group traffic from one of the first group members, e.g., the first VPN node $112_1$ to another of the first group members, e.g., the second VPN node $112_2$. The communication packet structure 200 may be used with other architectures, other group traffic, and between the other VPN nodes as well.

The communication packet 200 includes a first payload 202 encapsulated by a security-encapsulating header 204 and a first IP header 206. The first payload 202 may include, in encrypted form, a packet of the first group traffic ("encrypted-subnet packet"). The encrypted-subnet packet may be encrypted by the first VPN node $112_1$ using the first cipher. Underlying the encryption of the encrypted-subnet packet may be a packet of the first group traffic ("subnet packet"). The subnet packet may originate from a node in the first subnet 104 ("originating node") for termination to a node in the second subnet 106 ("terminating node").

The subnet packet, in turn, includes a second payload 212 and a second IP header 210. The second payload 212 generally includes information (e.g., data, control information, etc.) for transfer to the terminating node. The second IP header 210 includes a source address 214 and a destination address 216. The source address 214 is an IP address of the originating node, and the destination address 216 is an IP address of the terminating node.

The security-encapsulating header 204 may include an identifier for identifying to the VPN nodes $112_2$-$112_4$ that the VPN node $112_1$ secured the subnet packet (including the second IP header 212 and the second payload 210) in accordance with the first group-security policy. Because only the first group members (e.g., the VPN nodes $112_2$ and/or $112_3$) are configured and/or provisioned with the first group-security policy and the first cipher, only the first group members are able to decipher the encrypted-subnet packet. In addition to the identifier ("group-SA identifier"), the security-encapsulating header 204 may include a message-authentication code, such as a keyed-Hash Message-Authentication Code ("HMAC"). The message-authentication code may be used by the terminating node to authenticate the encrypted-subnet packet prior to decryption. This way, the termination node can discover and properly manage unauthorized modification of the encrypted-subnet packet To facilitate routing and forwarding in the VPN 112, the first IP header 206 is a copy of the second IP header 212. As such, the first IP header 206 includes a copy 218 of the source address 214 and a copy 220 of the destination address 216.

Advantageously, the structure of communication packet 200 allows the encrypted-subnet packet to follow an optimal routed path in the private network 102 without requiring an overlay routing protocol. In addition, the VPN node $112_1$ (as one of the first group members) can replicate the encrypted-subnet packet and follow an optimal multicast distribution tree in the private network 102.

Referring now to FIG. 3, a flow diagram illustrating an example communication flow 300 for carrying out a dynamic secured group communication is shown. For convenience, the example communication flow 300 is described with reference to the structure of the communication packet 200 of FIG. 2, to the example network architecture 100 of FIG. 1, and in particular, to communicating first group traffic from one of the first group members, e.g., the first VPN node $112_1$ to the another of the first group members, e.g., the second VPN node $112_2$. The communication flow 300 may be used with other architectures, other group traffic, and between the other VPN nodes as well.

As shown at flow indicator 302, the originating node forms the second payload 212. To form the second payload, the originating node may obtain the information for transfer to the terminating node, and place this information in the second payload 212. After placing the information in the second payload 212, the originating node may form a transport-layer packet as shown at flow indicator 304. To form the transport-layer packet, the originating node may encapsulate the second payload 212 in headers of a transport-layer protocol, such as a user-datagram protocol ("UDP") or a Transmission Control Protocol ("TCP").

After such encapsulation, the originating node forms the subnet packet, as shown at flow indicator 306. To form the subnet packet, the originating node applies the second IP header 210 to the transport-layer packet.

As shown at flow indicator 308, the originating node transmits the subnet packet into the first subnet toward the destination node. The first VPN node $112_1$ obtains the subnet packet from the first subnet, as shown at flow indicator 310.

After obtaining the subnet packet, the first VPN node $112_1$ (as one of the first group members) forms a first group-encrypted frame, as shown at flow indicator 312. To form the first group-encrypted frame, the first VPN node $112_1$ encrypts the subnet packet with the first cipher, and encapsulates such subnet packet with the security-encapsulating header 204, which includes the first group-security association and the message-authentication code. In addition, the first VPN node $112_1$ applies the first IP header 206 to the first group-encrypted frame to form a first group-encrypted packet, as shown at flow indicator 314.

As shown at flow indicator 316, the first VPN node $112_1$ routes and forwards the first group-encrypted packet into the VPN 112 towards the second VPN node $112_2$. As indicated by flow indicator 318, the first group-encrypted packet traverses the VPN 112 in accordance with the routing by the first VPN node $112_1$. After traversing the VPN 112, the second VPN node $112_2$ obtains the first group-encrypted packet, as shown at flow indicator 320.

After obtaining the first group-encrypted packet, the second VPN node $112_2$ authenticates the first group-encrypted packet, as shown at flow indicator 322. To authenticate the group-encrypted packet, the second VPN node $112_2$ obtains the message-authentication code from the security-encapsulating header 204; and then uses it to ensure that the group-encrypted packet is precisely the same as when it left the first VPN node $112_1$. This may include the second VPN node $112_2$ applying, for example, the HMAC along with a second cipher (that is pre-negotiated between the VPN nodes $112_1$-$112_4$). Alternatively, the VPN node $112_2$ may apply the HMAC along with the first cipher, which the second VPN node $112_2$ obtains responsive to obtaining the group-SA identifier from the security-encapsulating header 204.

After authenticating the first group-encrypted packet, the second VPN node $112_2$ extracts the subnet packet from the group-encrypted packet, as shown at flow indicator 324.

To extract the subnet packet, the second VPN node $112_2$ obtains the group-SA identifier from the security-encapsulating header 204. Using the group-SA identifier, the second VPN node $112_2$ obtains the first cipher associated with the first group-security association. After obtaining the first cipher, the second VPN node $112_2$ applies the first cipher to decrypt the encryption applied to the first group-encrypted frame to yield the subnet packet.

In addition, the second VPN node $112_2$ authenticates the subnet packet, as shown at flow indicator 326. As part of authenticating the subnet packet, the second VPN node $112_2$ ensures that the source and destination nodes conform to the first group-security policy. This may include ensuring that the source and destination addresses 214, 216 are listed as belonging to the first group. In addition, the second VPN node $112_2$ may compare a hash of the first IP header 206 with a hash of the second IP header 210. This may include comparing a hash of the source and destination addresses 214, 216 with a hash of the source-address and destination-address copies 218, 220 to ensure that they are the same.

As shown at flow indicator 328, the second VPN node $112_2$ forwards the subnet packet to the terminating node. As shown at flow indicator 330, the terminating node obtains the subnet packet. After obtaining the subnet packet, the terminating node extracts the information from the second payload 212, as shown at flow indicator 332. The terminating node may extract the information from the second payload 212 by reversing the functions carried out by the originating node shown at the flow indicators 306, 304, and 302.

Figure 4:
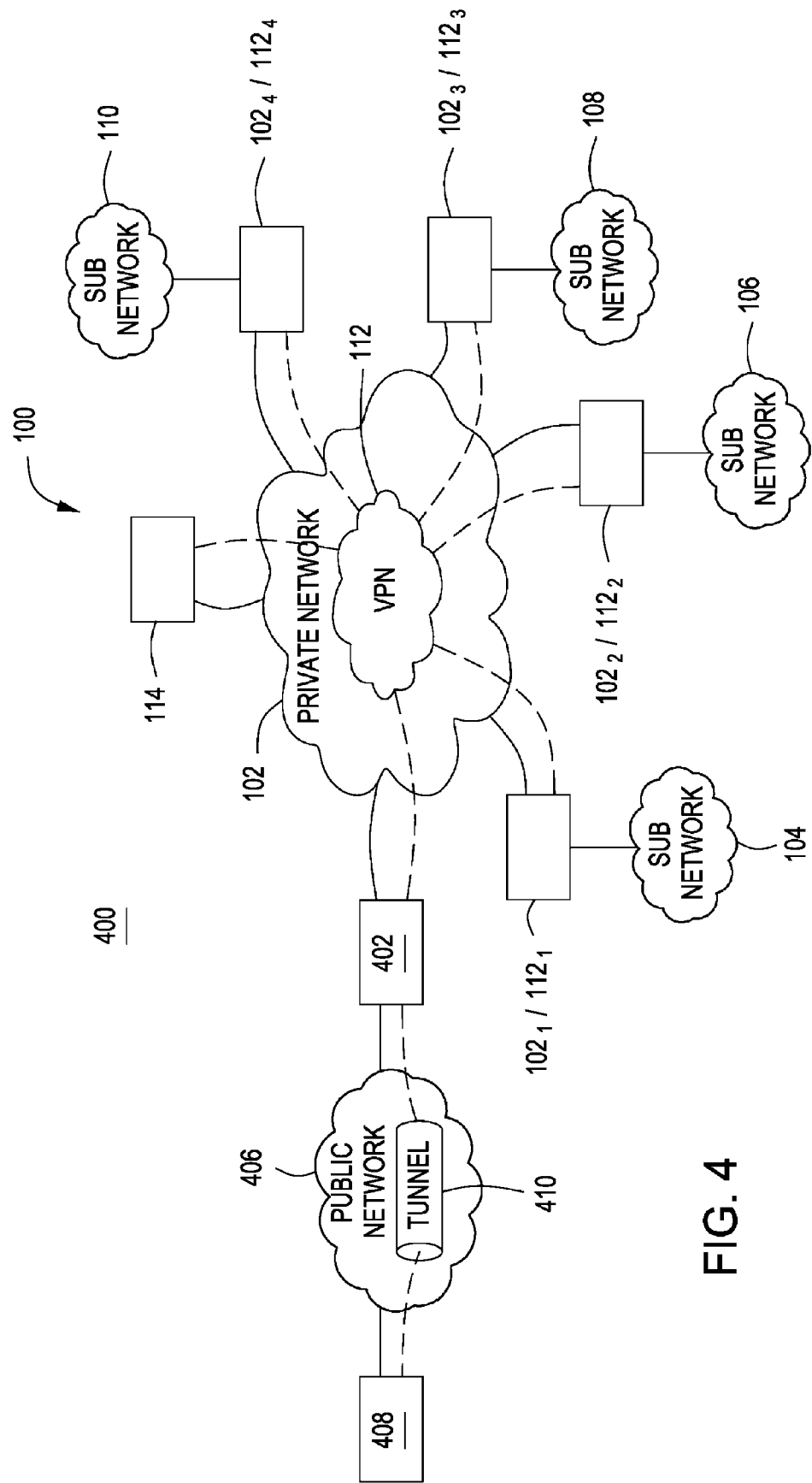
FIG. 4 is a block diagram illustrating a second example network architecture for carrying out a dynamic secured group communication.

FIG. 4 is a block diagram illustrating example network architecture 400 for carrying out a dynamic secured group communication. The network architecture 400 includes the network architecture 100 of FIG. 1, an access node 402, a publicly-accessible network ("public network") 406, and a peer node 408.

The public network 406 may be a partial or full deployment of most any telecommunication network, computer network or convergence thereof to which any interested member of the public can be provided with (e.g., served) communication services, including, for example, services for exchanging data. As such, the public network 406 may be or include any part of a public, terrestrial wireless or satellite, and/or wireline telecommunications and/or computer network. For example, the public network 406 may include all or portions of the Internet, proprietary public networks, other public wired and/or wireless packet-data networks, etc. Accordingly, the public network 406 may include a number of packet-data elements. These packet-data elements include one or more nodes (not shown) that employ network address translation ("NAT nodes"). These NAT nodes may employ one or more types of NAT, including network address and port translation ("NAPT") and basic NAT (i.e., network address translation without port mapping).

The access node 402 is communicatively coupled to both the public and private networks 102, 406. The access node 402 may, for example, be embodied as and/or function as a router for routing and/or forwarding the private network traffic and/or public network traffic in and/or between the private and public networks 102, 106. In addition, the access node 402 may apply NAT to the private network traffic routed and/or forwarded between the private and public networks 102, 406.

The access node 402 may also double as a fifth VPN node. Typically, the access node 402 does not maintain any of the group-security policies, and as such, is not a member of any group of the VPN 112. The access node 402, like the other VPN nodes 112$_1$-112$_4$, may forward the first and second group-encrypted traffic in accordance with the routing associated therewith. In addition, the VPN access node 402, as described in more detail below, functions to provide egress from or ingress to the VPN 112 for the first and/or second group-encrypted traffic originated from and/or terminated to the peer node 406.

The peer node 408 is communicatively coupled to the public network 406, and may, for example, be embodied as and/or function as a router. Alternatively, the peer node 408 may be customer premises equipment (e.g., a desktop, laptop or other type of computer). The peer node 408 may route and/or forward into the public network 406 traffic it obtains or generates ("peer traffic").

In addition, the peer node 408 may originate the first group-encrypted traffic to and/or terminate the first group-encrypted traffic from the first group members. Alternatively, the peer node 408 may originate the second group-encrypted traffic to and/or terminate the second group-encrypted traffic from the second group members. For simplicity of exposition, the following describes the peer node 408 with respect to the first group-encrypted traffic. The description, however, applies equally to the second group-encrypted traffic.

To facilitate originating and/or terminating the first group-encrypted traffic, the peer node 408 and the first group members form a first security relationship, and the peer node 408 and the access node 402 form a second security relationship. Through the first security relationship, the peer node 408 and the first group members form the first group-encrypted traffic. Through the second security relationship, the peer node 408 and the access node 402 securely transport or tunnel the first group-encrypted traffic through the public network 406.

To facilitate forming the first security relationship, the peer node 408 may, responsive to the VPN information, configure, provision and/or otherwise cause itself to function as one of the first group members. This way, the peer node 408 may use the first group-security policy to (i) form the first group-encrypted traffic for origination to the first group members, and/or (li) disassemble the first group-encrypted traffic for termination.

The peer node 408 may be manually configured and/or provisioned with the VPN information. Alternatively, the peer node 408 may obtain the VPN information from security-management node 114 by way of a negotiation through a secured channel, such as a tunnel formed in accordance with Internet Protocol security ("IPSec") as set forth in Internet Engineering Task Force ("IETF") Request for Comments ("RFC") 4301-4309.

To facilitate forming the second security association, the peer node 408 and the access node 402 may negotiate or otherwise form a secure channel or tunnel (collectively "tunnel") 410. To facilitate forming the tunnel 410, the peer node 408 and the access node 402 may apply a tunneling protocol to the first group-encrypted traffic. The tunneling protocol may apply (i) encryption and authentication, (ii) encryption alone or (ii) authentication alone to the first group-encrypted traffic. Examples of the tunneling protocol include IPSec and/or IPSec as extended, varied, modified and/or changed by IETF RFC 3947, namely, Negotiation of Network-Address-Translator Traversal ("NAT-T"). Other examples of the tunneling protocol are described below.

Referring now to FIG. 5, a block diagram illustrating an example structure of a communication packet 500 for carrying out a dynamic secured group communication is shown. For convenience, the structure of the communication packet 500 is described with reference to the example network architecture 400 of FIG. 4, and in particular to communicating the first group-encrypted traffic between the peer node 408 and one of the first group members, e.g., the second VPN node 112$_2$. The structure of the communication packet 500 may be used with other architectures, other group traffic, between other group members, and between other VPN nodes as well.

The communication packet 500 defines a packet for tunneling a first group-encrypted packet through the tunnel 410. This tunnel packet includes a first payload 502 encapsulated by a first security-encapsulating header 504, a UDP/NAT-T header 505 and a first IP header 506. The first payload 502 may include, as encrypted and/or authenticated in accordance with the tunneling protocol, the first group-encrypted packet. The first group-encrypted packet underlying the tunneling protocol originates from the peer node 408 for termination to the terminating node in the second subnet 106.

The first group-encrypted packet, in turn, includes a second payload 510, a second security-encapsulating header 512, and a second IP header 514. The second payload 510 may include a packet of the peer traffic ("peer-traffic packet") encrypted and/or authenticated in accordance with the first group-security policy. The peer-traffic packet underlying such encryption and/or authentication originates from the peer node 408 for termination to the terminating node in the second subnet 106.

The peer-traffic packet, in turn, includes a third payload 518 and a third IP header 520. The third payload 518 generally includes information (e.g., data, control information, etc.) for transfer to the terminating node. The third IP header 520 includes a source address 522 and a destination address 524. The source address 522 is an IP address of the peer node 408, and the destination address 524 is the IP address of the terminating node.

The second security-encapsulating header 512 may include an group-SA identifier for identifying to the VPN nodes $112_2$-$112_4$ that the peer node 408 secured the peer-traffic packet (including the third IP header 520 and the third payload 518) in accordance with the first group-security policy. Because only the first group members (e.g., the VPN nodes $112_1$-$112_3$) are configured and/or provisioned with the first group-security policy and the first cipher, only the first group members are able to decipher the first group-encrypted packet and extract the peer-traffic packet.

To facilitate routing and forwarding in the VPN 112, the second IP header 514 is a copy of the third IP header 520. As such, the second IP header 514 includes a copy 526 of the source address 522 and a copy 528 of the destination address 524.

The first security-encapsulating header 504 may include an identifier for identifying to the access node 402 that the peer node 408 secured the first group-encrypted packet in accordance with the tunneling protocol. Because only the peer and access nodes 402, 408 are configured and/or provisioned to carry out the tunneling protocol, only the peer and access nodes 402, 408 are able to decipher the encryption applied to the first group-encrypted packet and extract the first group-encrypted packet from the tunnel packet.

To facilitate routing and forwarding through the tunnel 410, the first IP header 506 includes a source address 530 and a destination address 532. The source address 530 is the IP address of the peer node 408, and the destination address is the IP address of the access node 402. The UDP/NAT-T header 505 may be used by the access node 402 to authenticate the tunnel packet given that the tunnel packet may undergo NAT as it traverses the tunnel 410.

Advantageously, the structure of the communication packet 500 allows the first group-encrypted packets to traverse the public network while allowing the first-group encrypted packets to follow an optimal routed path in the private network 102 without requiring the overlay routing protocol. In addition, the peer node 408, as one of the first group members, can replicate the first group-encrypted packet and follow an optimal multicast distribution tree in the private network 102.

Referring now to FIG. 6, a flow diagram illustrating an example communication flow 600 for carrying out a dynamic secured group communication is shown. For convenience, the example communication flow 600 is described with reference to the structure of the communication packet 500 of FIG. 5, to the example network architecture 400 of FIG. 1, and in particular, to communicating the first group-encrypted traffic between the peer node 408 and one of the first group members, e.g., the second VPN node $112_2$. The communication flow 600 may be used with other architectures, other group traffic, and between the other VPN nodes as well.

As shown at flow indicator 602, the peer node 408 and the access node 402 establish the tunnel 406 via a negotiation carried out in accordance with one or more protocols for securing IP communications ("security protocols"). These security protocols may include, for example, IPSec; one or more extensions, variations, modifications, and/or changes to IPSec; sub-protocols of IPSec, such as Internet Key Exchange ("IKE"); and/or one or more extensions, variations, modifications, and/or changes to IKE. This includes such extensions, variations, modifications, and/or changes that are (i) described herein and/or (ii) consistent with or logical or otherwise reasonable extensions of the extensions, variations, modifications, and/or changes described herein or described elsewhere in the public domain.

In general, either of the peer node 408 or the access node 402 may begin or otherwise initiate the negotiation. Alternatively, one or more rules set forth in the security protocols may dictate which of the peer node 408 or the access node 402 is to initiate the negotiation. The rules may dictate, for example, that, by default, only the peer node 408 or only the access node 402 may initiate the negotiation.

Alternatively, the rules may dictate (as described in more detail below) that the peer node 408 is to initiate the negotiation when (i) it encounters the information for transfer to the terminating node ("terminating-node information") and/or the first group-encrypted traffic, and (ii) the tunnel 410 is not already established. Alternatively, but analogously, the rules may dictate that access node 402 is to initiate the negotiation when (i) it encounters the terminating-node information and/or first group-encrypted traffic, and (ii) the tunnel 410 is not already established. The rules may dictate other ways for the peer node 408 and the access node 402 to initiate the first-security negotiation as well.

For ease of exposition, the following assumes that the rules dictate that the peer node 408 initiates the negotiation after it encounters the terminating-node information and the tunnel 410 is not already established. Responsive to encountering the terminating-node information, the peer node 408 initiates a communication session with the access node 402 in accordance with phase one (1) of IKE as extended, varied, modified and/or changed by IETF RFC 3947, namely, Negotiation of Network-Address-Translator Traversal ("NAT-T"). Responsive to this ("phase 1 IKE/NAT-T") session, the peer and access nodes 408, 402 establish a secure channel for negotiating matching IPSec security associations in accordance with phase two (2) of IKE. Responsive to completing negotiation of the matching IPSec security associations, the peer and access nodes 408, 402 establish the tunnel 410.

As shown at flow indicator 604, the peer node 408 forms the third payload 518. To form the third payload 518, the peer node 408 may obtain the terminating-node information, and place this information in the third payload 518. After placing the terminating-node information in the third payload 518, the peer node 408 may form a transport-layer packet as shown at flow indicator 606. To form the transport-layer packet, the peer node 408 may encapsulate the third payload 518 in headers of a transport-layer protocol, such as UDP or TCP.

After such encapsulation, the peer node 408 forms the peer-traffic packet, as shown at flow indicator 408. To form the peer-traffic packet, the peer node applies the third IP header 520 to the transport-layer packet.

As shown at flow indicator 610, the peer node 408 (as one of the first group members) forms a first group-encrypted frame. To form the first group-encrypted frame, the peer node 408 encrypts the peer-traffic packet with the first cipher, and encapsulates such peer-traffic packet with the security-encapsulating header 512, which includes the first group-security association and the message-authentication code. In addition, the peer node 408 applies the second IP header 514 to the first group-encrypted frame to form a first group-encrypted packet, as shown at flow indicator 612.

As shown at flow indicator 614, the peer node 408 forms the tunnel packet for transport to the access node 402. To form the tunnel packet, the peer node 408 applies the IPSec security association to the first group-encrypted packet to encrypt and/or authenticate the first group-encrypted packet in accordance with IPSec's encapsulating security payload ("ESP") protocol. This may include the peer node 408 encapsulating the first group-encrypted packet, as so encrypted, in the second security-encapsulation header 512, which may be, for example, the ESP protocol, so as to form an ESP frame.

In addition, the peer node 408 encapsulates the ESP frame in the UDP/NAT-T headers 505, and applies the first IP header 506 to the UDP/NAT-T encapsulated ESP frame. The UDP/NAT-T headers 505 enable the access node 402 to authenticate the tunnel packet after traversing one or more of the NAT nodes of the public network 406.

After forming the tunnel packet, the peer node 408 routes and forwards the tunnel packet into the tunnel 410 towards the access node 402, as shown at flow indicator 616. As indicated by flow indicator 618, the tunnel packet traverses the tunnel 410 in accordance with the routing by the peer node 408. After traversing the tunnel 410, the access node 402 obtains the tunnel packet, as shown at flow indicator 620.

As shown at flow indicator 622, the access node 402 authenticates the tunnel packet. The access node 402 may authenticate the tunnel packet as a function of UDP/NAT-T headers 505. After authenticating the tunnel packet, the access node 402 extracts the first group-encrypted packet from the tunnel packet. To extract the first group-encrypted packet, the access node 402 obtains from the first security-encapsulating header 504 an identifier for identifying the IPSec matching security association ("IPSec-SA identifier"). Using the IPSec-SA identifier, the access node 402 decrypts the encryption applied to the first group-encrypted packet so as to yield the first group-encrypted packet.

After extraction, the access node 402 forwards the first group-encrypted packet to the second VPN node 112$_2$, via the VPN 112, as shown at flow indicator 626. The second VPN node 112$_2$ obtains the first group-encrypted packet, as shown at flow indicator 628.

After obtaining the first group-encrypted packet, the second VPN node 112$_2$ authenticates the first group-encrypted packet, as shown at flow indicator 630. To authenticate the group-encrypted packet, the second VPN node 112$_2$ obtains the message-authentication code from the security-encapsulating header 504; and then uses it to ensure that the group-encrypted packet is precisely the same as when it left the first VPN node 112$_1$. This may include the second VPN node 1122 applying, for example, the HMAC along with the second cipher that is pre-negotiated between the VPN nodes 112$_1$-112$_4$. Alternatively, the VPN node 112$_2$ may apply the HMAC along with the first cipher, which the second VPN node 112$_2$ obtains responsive to obtaining the group-SA identifier from the security-encapsulating header 504.

After authenticating the first group-encrypted packet, the second VPN node 112$_2$ extracts the peer-traffic packet from the first group-encrypted packet, as shown at flow indicator 632. To extract the peer-traffic packet, the second VPN node 112$_2$ obtains from the second security-encapsulating header 512 the identifier for identifying the first group-security association. Using the identifier, the second VPN node 112$_2$ obtains the first cipher associated with the first group-security association. After obtaining the first cipher, the second VPN node 112$_2$ applies the first cipher to decrypt the encryption applied to the first group-encrypted frame to yield the peer-traffic packet.

In addition, the second VPN node 112$_2$ authenticates the peer-traffic packet, as shown at flow indicator 634. As part of authenticating the peer-traffic packet, the second VPN node 112$_2$ ensures that the source and destination nodes conform to the first group-security policy. This may include ensuring that the source and destination addresses 214, 216 are listed as belonging to the first group. In addition, the second VPN node 112$_2$ may compare a hash of the second IP header 514 with a hash of the third IP header 520. This may include comparing a hash of the source and destination addresses 522, 524 with a hash of the source-address and destination-address copies 526, 528 to ensure that they are the same.

As shown at flow indicator 636, the second VPN node 112$_2$ forwards the peer-traffic packet to the terminating node. As shown at flow indicator 638, the terminating node obtains the peer-traffic packet. After obtaining the peer-traffic packet, the terminating node extracts the information from the third payload 518, as shown at flow indicator 640. The terminating node may extract the information from the third payload 518 by reversing the functions carried out by the peer node 408 shown at the flow indicators 608, 606, and 604.

Referring now to FIG. 7, a flow diagram illustrating an example communication flow 700 for carrying out a dynamic secured group communication is shown. For convenience, the example communication flow 700 is described with reference to the structure of the communication packet 500 of FIG. 5, to the example network architecture 400 of FIG. 1, and in particular, to communicating the first group-encrypted traffic between the peer node 408 and one of the first group members, e.g., the first VPN node 112$_1$. The communication flow 700 may be used with other architectures, other group traffic, and between the other VPN nodes as well.

As shown at flow indicator 702, the originating node in the first subnet 104 forms the third payload 518. To form the third payload 518, the originating node may obtain the information for transfer to the peer node 408, and place this information in the third payload 518. After placing the information in the third payload 518, the originating node may form a transport-layer packet as shown at flow indicator 704. To form the transport-layer packet, the originating node may encapsulate the third payload 518 in headers of a transport-layer protocol, such as UDP or TCP.

After such encapsulation, the originating node forms the subnet packet, as shown at flow indicator 706. To form the subnet packet, the originating node applies the third IP header 520 to the transport-layer packet.

As shown at flow indicator 708, the originating node transmits the subnet packet into the first subnet toward the first VPN node 112$_1$. The first VPN node 112$_1$ obtains the subnet packet, as shown at flow indicator 710.

After obtaining the subnet packet, the first VPN node 112$_1$ (as one of the first group members) forms a first group-encrypted frame, as shown at flow indicator 712. To form the first group-encrypted frame, the first VPN node 112$_1$ encrypts the subnet packet with the first cipher, and encapsulates such subnet packet with the second security-encapsulating header 512, which includes the first group-security association. In addition, the first VPN node 112$_1$ applies the second IP header 514 to the first group-encrypted frame to form a first group-encrypted packet, as shown at flow indicator 714.

As shown at flow indicator 716, the first VPN node 112$_1$ routes and forwards the first group-encrypted packet into the VPN 112 towards the access node 402. As indicated by flow indicator 718, the first group-encrypted packet traverses the VPN 112 in accordance with the routing by the first VPN node 112$_1$. After traversing the VPN 112, the access node 402 obtains the first group-encrypted packet, as shown at flow indicator 720.

As shown at flow indicator 722, the access node 402 and the peer node 408 establish the tunnel 406 via a negotiation carried out in accordance with the security protocols. This negotiation may be carried out as described above with respect to flow indicator 612 (FIG. 6), except that the access node 402 may initiate the negotiation responsive to obtaining the first group-encrypted packet.

As shown at flow indicator 724, the access node 402 forms the tunnel packet for transport to the peer node 408. To form the tunnel packet, the access node 402 applies the IPSec security association to the first group-encrypted packet to encrypt and/or authenticate first group-encrypted packet in accordance with IPSec's encapsulating security payload ("ESP") protocol. This may include the access node 402 encapsulating the first group-encrypted packet, as so encrypted, in the second security-encapsulation header 512, which may be, for example, the ESP protocol, so as to form the ESP frame.

In addition, the access node 402 encapsulates the ESP frame in the UDP/NAT-T headers 505, and applies the first IP header 506 to the UDP/NAT-T encapsulated ESP frame. The UDP/NAT-T headers enable the peer node 408 to authenticate the tunnel packet after traversing one or more of the NAT nodes of the public network 406. After forming the tunnel packet, the access node 402 routes and forwards the tunnel packet into the tunnel 410 towards the peer node 408, as shown at flow indicator 726.

As indicated by flow indicator 728, the tunnel packet traverses the tunnel 410 in accordance with the routing by the access node 402. After traversing the tunnel 410, the peer node 408 obtains the tunnel packet, as shown at flow indicator 730.

As shown at flow indicator 732, the peer node 408 authenticates the tunnel packet. The peer node 408 may authenticate the tunnel packet as a function of UDP/NAT-T headers 505. After authenticating the tunnel packet, the peer node 408 extracts the first group-encrypted packet from the tunnel packet, as shown at flow indicator 734. To extract the first group-encrypted packet, the peer node 408 obtains from the first security-encapsulating header 504 an identifier for identifying the IPSec matching security association. Using the identifier, the peer node 408 decrypts the encryption applied to the first group-encrypted packet to yield the first group-encrypted packet.

After extraction, the peer node 408 extracts the subnet packet from the first group-encrypted packet, as shown at flow indicator 734. To extract the subnet packet, the peer node 408 obtains from the second security-encapsulating header 512 the identifier for identifying the first group-security association. Using the identifier, the peer node 408 obtains the first cipher associated with the first group-security association. After obtaining the first cipher, the peer node 408 applies the first cipher to decrypt the encryption applied to the first group-encrypted frame to yield the subnet packet.

In addition, the peer node 408 authenticates the subnet packet, as shown at flow indicator 738. As part of authenticating the subnet packet, the peer node 408 may compare a hash of the second IP header 514 with a hash of the third IP header 520. This may include comparing a hash of the source and destination addresses 522, 524 with a hash of the source-address and destination-address copies 526. 528 to ensure that they are the same.

As shown at flow indicator 740, the peer node 408 extracts the information from the third payload 518. The peer node 408 may extract the information from the third payload 518 by reversing the functions carried out by the originating node shown at the flow indicators 706, 704, and 702.

As an alternative to tunneling the tunnel packet through the tunnel 410 in accordance with IPSec and to attendant costs for encrypting and authenticating under IPSec, the tunneling protocol that the peer and access nodes 408, 402 employ may be an authentication protocol, which may be reflected in the first security-encapsulating header 504 of the communication packet. The authentication protocol may be defined so as to minimize encapsulation of the first group-encrypted traffic. Without encryption, the tunnel packet may traverse the public network 406 under conditions in which observation of the first group-encrypted traffic are viable. Although the contents of each of the first group-encrypted packets are encrypted in accordance with the first group-security policy, the relationship between the peer node 408 and the access node 402 may be clear text.

As an alternative to minimal authentication, the authentication protocol may define a time-based window for authenticating the tunnel packet. The time-based window may define a point in time that signifies a beginning or start of the time-based window ("start time") and a duration of time ("time duration"). The time duration is an amount of time to be counted from the start time; an expiration of which defines a time that signifies an end or termination of the time-based window ("end time"). The start time and the time duration may be formed (e.g., hashed or otherwise secured) to prevent unwarranted detection.

Both of the start time and the time duration may be synchronized to a time system maintained by the peer and access nodes 408, 402. Each of the peer and access nodes 408, 402 may maintain accuracies of the time system using protocols for maintaining the time system, such as Network Time Protocol ("NTP"), Daytime Protocol, Internet Control Message Protocol ("ICMP"), Hypertext Transfer Protocol ("HTTP") Time Protocol ("HTP"), Time protocol, and the like. Alternatively, neither or only one of the peer and access nodes 408, 402 may maintain accuracies of the time system. In this case, the start time and the time duration may be synchronized to the time system maintained by either peer node 408 or the access node 402. An example of a tunnel packet formed in accordance with the authentication protocol is shown in FIG. 8.

Referring now to FIG. 8, a block diagram illustrating a tunnel packet 800 formed in accordance with the authentication protocol is shown. This tunnel packet 800 may be used to carry out a dynamic secured group communication. For convenience, the tunnel packet 800 is described with reference to the structure of the communication packet 500 of FIG. 5, to the example network architecture 400 of FIG. 1. The tunnel packet 800 may be used with other architectures, other group traffic, and between the other VPN nodes as well. In addition, the tunnel packet 800 of FIG. 8 is similar to the communication packet 500 of FIG. 5, except as described herein below.

The first security-encapsulation header 504 includes a token 802 for authenticating the tunnel packet 800. The token includes a hashed time-stamp, denoted as c_tag 804, which is carried between peer node 408 and the access node 402. The c_tag 804 may be used by the access node 408 to ensure that the tunnel packet obtained by the access node 402 is only generated by the peer node 402. Using the time-based window, the peer and access nodes 408, 402 are synchronized such that the c_tag changes according the system time yet the access node 402 and/or the peer node 408 can authenticate the hashed time-stamp. This may be represented as follows:

possible c_tag values=a keyed-Hash Message Authentication Code−HMAC(key, timestamp)
where:
the key is key distributed from the access node 402 to the peer node;
the time stamp is a pseudotime.

To validate the tunnel packet, the access node 402 precomputes a number of c-tag values by applying N number of time stamps that are currently within the time-based window (e.g., 10 seconds with 1 second increments) to the HMAC (key, timestamp) function. Upon receipt of the tunnel packet, the access node 402 searches the possible c_tag values for a c_tag value that matches the c_tag 804. A successful match indicates that the tunnel packet was generated by peer node.

As another alternative, the c_tag values may be defined as:
the possible c_tag values=DESX(key, timestamp||destination_address)
where:
DESX is the variant of the Data Encryption Standard ("DESX") function;
the key is a key distributed from the access node 402 to the peer node 408;
the time stamp is the pseudotime; and
the destination_address may be the second destination address 528 or some portion thereof.

As yet another alternative, the access node 402 may, responsive to obtaining the VPN information, configure, provision and/or otherwise cause itself to function as one of the first group members to obtain the first cipher. The access node 402 may use first cipher to simply authenticate (but not decrypt) the tunnel packet.

Analogous to the access node 402, the peer node 408 may employ the authentication protocol. Employing the authentication protocol at the peer node 408 may be optional as the peer node 408 may decrypt and authenticate the first group-encrypted packet underlying the authentication protocol.

As an alternative to the access node 408 distributing the key for either the HMAC or DESX function, the key may be synchronized between the peer node 408 and the access node 402 in other ways. For example, the peer node 408 and access node 402 may use traditional mechanisms such as per-peer pre-shared keys or certificates, and/or establish a secure channel through which the peer node 408 and the access node 408 may exchange the time stamp and key. The peer node 408 may, for example, synchronizes its c_tag 820 using the time stamp provide by the access node 402 and use the key to authenticate the tunnel packet. Since a time clock of the peer node 408 may drift, the access node 402 may include the c_tag 804 to enable the peer node 408 to maintain time synchronization.

Figure 9:
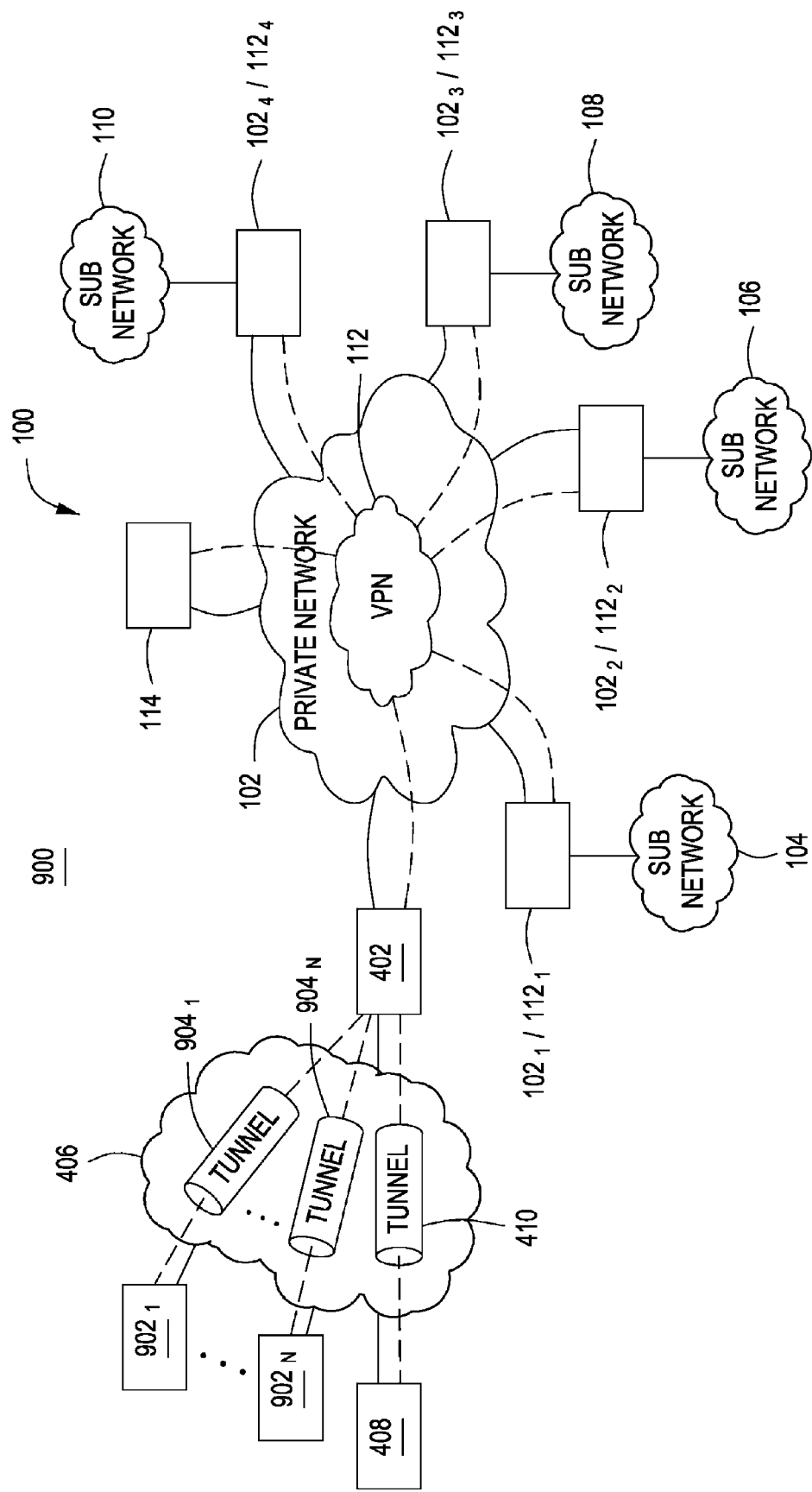
FIG. 9 is a block diagram illustrating a third example network architecture for carrying out a dynamic secured group communication.

FIG. 9 is a block diagram illustrating example network architecture 900 for carrying out a dynamic secured group communication. The network architecture 900 is similar to the network architecture 400 of FIG. 4, except as described herein below.

As shown, the network architecture 900 includes a number of peer nodes $902_1$-$902_n$ in addition to the peer node 408. Each of these peer nodes $902_1$-is communicatively coupled to the public network 406, and may, for example, be embodied as and/or function as a router. Alternatively, each of the peer nodes $902_1$-$902_n$ may be customer premises equipment (e.g., a desktop, laptop or other type of computer). Like the peer node 408, each of the peer nodes $902_1$-$902_n$ may route and/or forward into the public network 406 traffic it's peer traffic.

In addition, each of the peer nodes $902_1$-$902_n$ functions in the same way as the peer node 408. As such, each of the peer nodes $902_1$-$902_n$ may tunnel, in accordance with IPSec or other tunneling protocol that uses encryption, the first group-encrypted traffic via respective tunnels $904_1$-$904_n$ negotiated with the access node 402. Alternatively, each of the peer nodes $902_1$-$902_n$ may use the authentication protocol to securely transport the first group-encrypted traffic via the tunnels $904_1$-$904_n$.

When using the authentication protocol, each of the peer nodes $902_1$-$902_n$ may use the same c_tag, key and/or other authentication parameters given that each of the peer nodes $902_1$-$902_n$ securely transport only first group-encrypted traffic. If, however, one or more of the peer nodes $902_1$-$902_n$ securely transport second group-encrypted traffic, then the c_tag, key and/or other authentication parameters may be different for such peer nodes $902_1$-$902_n$.

An advantage of the foregoing is that the access node 402 may replicate the first group-encrypted traffic for multicast to each of the peer nodes 408 and $902_1$-$902_n$ without having to encrypt or authenticate each tunnel packet with a unique pair-wise attribute (e.g., IPSec's matching security associations). As noted above, the access node 402 may use the HMAC(key, timestamp) or DESX(key, timestamp||destination_address) functions to calculate the c_tag 804 to ensure that each tunnel packet exchanged between the each of the peer nodes 408 and $902_1$-$902_n$ and the access node 408 are valid without having to perform encryption and/or decryption at the peer nodes 408 and $902_1$-$902_n$ and/or the access node 408. Since all the clients are synchronized with the tunnel aggregator, the tunnel aggregator can use the same c_tag for all the frames encapsulated in the NAT-T UDP/IP headers 505 for a given time frame in that group.

Another advantage is that the peer nodes 408 and $902_1$-$902_n$ and the access node 408 allow the first group-encrypted packet to traverse the public network 406 that include NAT nodes. Yet another advantage is that routing adjacencies established between each of the peer nodes 408 and $902_1$-$902_n$ and the access node 408 can pass through the tunnels 410, and $904_1$-$904_n$ in an authenticated manner while not requiring encryption of such routing adjacencies.

Although not shown, the network architecture 900 may include additional access nodes. Advantageously, each of the peer nodes 408 and $902_1$-$902_n$ may establish additional tunnels to such additional access nodes. This allows for diverse routing via such tunnel overlay while continuing to use the first security relationship on any of the tunnels. This, in turn, facilitates stateful fail-over paths using such tunnels to the access nodes. Since the access nodes do not typically maintain state for the group-encryption policies; any of the access nodes still operating may be used for transport access to VPN 112.

Example Network Node Architecture

FIG. 10 is a block diagram illustrating an example network node 1000 for use with carrying out a dynamic secured group communication. This network node 1000 may embody any of the network nodes discussed above.

The network node 1000 may include a number of elements, many of which are not shown for simplicity of exposition. The network node 1000 may be formed as or in a single unitary device and concentrated on a single server, client, peer or other type node. Alternatively, the network node 1000 may be formed in or from one or more separate devices, and as such, may be distributed among a number of server, client, peer or other type nodes. The network node 1000 may be scalable (i.e., may employ scale-up and/or scale-out approaches). In addition, the network node 1000 may be integrated into or otherwise combined with another apparatus.

As shown, the network node 1000 includes logic 1002, memory 1004 and an input/output ("I/O interface") 1006; some or all of which may be coupled together via one or more communication links 1008. The logic 1002 is operable to control, manipulate or otherwise interact with the memory 1004 and/or the I/O interface 1006 via the respective communication links 1008.

To facilitate this, the logic 1002 may include one or more processing units (collectively "processor") 1010 and support circuits 1012. The processor 1010 may be one or more conventional processors, microprocessors, multi-core processors and/or microcontrollers. The support circuits 1012 facilitate operation of the processor 1010 and may include well-known circuitry or circuits, including, for example, an I/O interface; cache; clock circuits; power supplies; and the like.

The memory 1004 may store and/or receive requests from the processor 1010 to obtain and/or store the VPN information. In addition, the memory 1004 may store and/or receive requests from the processor 1010 to obtain various software packages, such as an operating system 1014 and software for carrying out one or more of the security policies ("security-policy software 1016"). The memory 1004 may also store and receive requests from the processor 1010 to obtain operands, operators, dimensional values, configurations, and other data that are used by the operating system 1014 and the security-policy software 1016 to control operation of and/or to facilitate performing the functions of the network node 1000. To facilitate the foregoing, the memory 1004 may be or employ random access memory, read-only memory, optical storage, magnetic storage, removable storage, erasable programmable read only memory and variations thereof, content addressable memory and variations thereof, flash memory, disk drive storage, removable storage, any combination thereof, and the like.

The communication links 1008 provide for transmissions of analog or digital information among the logic 1002, the memory 1004, the I/O interface 1006 and other portions of the network node 1000 (shown and not shown). The I/O interface 1006 is adapted to control transmissions of information, such as the VPN information, between (shown and not shown) elements of the network node 1000, such as the logic 1002 and the memory 1004.

In addition, the I/O interface 1006 is adapted to control transmissions of information, such as the VPN information, between elements of the network node 1000, an external data source and other I/O devices disposed within, associated with or otherwise attached or coupled to the network node 1000. Examples of the I/O devices include (i) a monitor, (ii) any or any combination of storage devices, including but not limited to, a tape drive, a floppy drive, a hard disk drive or a compact disk drive, (iii) a receiver and/or a transmitter, (iv) a speaker, (v) a display, (vi) a speech synthesizer, (vii) an output port, and (viii) the like. The external data source may be, for example, a key management server (not shown) as provided in the above-incorporated, co-pending U.S. patent application Ser. No. 10/867,266, filed 14 Jun. 2004, and/or in the above-incorporated *Cisco Group Encrypted Transport VPN* (*Cisco IOS Security Configuration Guide*), Cisco Systems, Inc. Nov. 17, 2006, (ii) *Cisco Group Encrypted Transport VPN Data Sheet and/or Technical Overview.*

The operating system 1014 may include code for operating the network node 1000 and for providing a platform onto which the security-policy software 1016 can be executed. The security-policy software 1016 may be in any of a standalone, client/server, peer-to-peer and other format. In addition, the security-policy software 1026 may include code for facilitating the forming of the first and second security relationships. The security-policy software 1016 may also include code to facilitate carrying out of any of the communication flows 300, 600 and 800.

CONCLUSION

Those skilled in the art will appreciate that the present invention, according to its various embodiments, Variations of the method, apparatus and system described above are possible without departing from the scope of the invention. In view of the wide variety of embodiments that can be applied, it should be understood that the illustrated embodiments are exemplary only, and should not be taken as limiting the scope of the following claims. For instance, in the exemplary embodiments described herein include handheld devices, which may include or be utilized with any appropriate voltage source, such as a battery and the like, providing any appropriate voltage.

In addition to the tunneling protocol discussed above, the tunneling protocol may include any or any combination of Internet Protocol security ("IPSec"); Generic Routing Encapsulation ("GRE"); IP in IP tunneling; Layer 2 Tunneling Protocol ("L2TP"); Multi-protocol Label Switching ("MPLS"); General-Packet-Radio Service ("GPRS") Tunneling Protocol ("GTP"); Point-to-Point Tunneling Protocol ("PPTP"); Point-to-Point Protocol over Ethernet ("PPPoE"); Point-to-Point Protocol over ATM ("PPPoA"); Institute of Electrical and Electronic Engineers ("IEEE") 802.1Q; IPversion 6 ("IPv6") tunneling, such as 6 to 4, 6 in 4, Teredo; Anything In Anything ("AYIYA") such as IPv6 over UDP over IPv4, IPv4 over IPv6, IPv6 over TCP IPv4, etc.); and/or modifications, revisions, versions and/or changes thereto (as described above or otherwise known or documented).

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

We claim:

1. A method comprising:

obtaining a first packet that includes a first Internet Protocol (IP) header and a first payload, wherein the first IP header includes a first source address of a first source node of a first private network and a first destination address of a first destination node of the first private network, and the first payload includes a second packet that has a second IP header and a second payload, the second IP header having a second source address of a second source node of a second virtual private network partitioned from resources of, formed over, established within or via, the first private network and a second destination address of a second destination node of the second virtual private network;

encrypting the first packet to form an encrypted-subnet packet;

encapsulating the encrypted-subnet packet with a group-security association formed in accordance with a group-security policy to generate a group-encrypted packet using a tunneling protocol for tunneling the group-encrypted packet between the first source node of the first network and the first destination node of the first private network such that only the first source node of the first private network and the first destination node of the first private network are able to decipher the encrypted-subnet packet that is encapsulated in the group-encrypted packet with a message-authentication code identified for the encrypted-subnet packet, wherein the encrypted-subnet packet comprises a security-encapsulating header configured with identifiers of the first source node, the first destination node, the second source node, and the second destination node;

replicating the group-encrypted packet at the first source node of the first private network such that the group-encrypted packet follows a multicast distribution tree in the first private network; and transmitting the group-encrypted packet into the second virtual private network from the second source node for delivery to the second destination node.

2. The method of claim 1, further comprising:

receiving the group-encrypted packet at the second destination node of the second virtual private network;

authenticating the group-encrypted packet based on the identifiers in the security-encapsulating header;

extracting the encrypted-subnet packet from the group-encrypted packet;

obtaining the first packet from the encrypted-subnet packet; and transmitting the first packet to the first destination node.

3. The method of claim 2, further comprising:

receiving the first packet at the first destination node; and obtaining the first payload of the first packet and the second payload of the second packet.

4. The method of claim 1, wherein encrypting comprises encrypting the first packet with a security association for securing the first packet using a cipher, wherein the cipher is pre-negotiated to be associated to (i) a security credential established by at least one node of the first network and (ii) an indicator that indicates that the first source node and the first destination node belong to the first private network.

5. The method of claim 4, wherein encrypting comprises encrypting the second IP header with a security association for authenticating the second source node.

6. The method of claim 4, wherein encrypting comprises encrypting the second IP header with the security association that comprises a token used for authenticating the group-encrypted packet by the tunneling protocol.

7. The method of claim 6, wherein encrypting comprises encrypting the second IP header using the token that is based on (i) a time system maintained by the second destination node, and (ii) a shared secret maintained by the second destination node.

8. The method of claim 6, wherein encrypting comprises encrypting the second IP header using the token that is based on (i) a time system maintained by the second source node, and (ii) a shared secret maintained by the second source node.

9. The method of claim 1, further comprising at the first source node and the first destination node of the first private network, initiating negotiations for secure transmission of the group-encrypted packet to the second virtual private network.

10. A method comprising:

obtaining a first packet that includes a first Internet Protocol (IP) header, a security-encapsulating header and a first payload, wherein the first IP header includes a first source address of a first source node of a first private network and a first destination address of a first destination node of the first network, the first payload includes a second packet that has a second IP header and a second payload, the second IP header having a second source address of a second source node of a second virtual private network partitioned from resources of, formed over, established within or via, the first private network and an encrypted second destination address of a second destination node of the second virtual private network;

encrypting the first packet to form an encrypted-subnet packet;

encapsulating the encrypted-subnet packet with a group-security association formed in accordance with a group-security policy to generate a group-encrypted packet using a tunneling protocol for tunneling the group-encrypted packet between the first source node of the first network and the first destination node of the first private network such that only the first source node of the first private network and the first destination node of the first private network are able to decipher the encrypted-subnet packet that is encapsulated in the group-encrypted packet with a message-authentication code identified for the encrypted-subnet packet, wherein the encrypted-subnet packet comprises a security-encapsulating header configured with identifiers of the first source node, the first destination node, the second source node, and the second destination node;

replicating the group-encrypted packet at the first source node of the first private network such that the group-encrypted packet follows a multicast distribution tree in the first private network; and transmitting the group-encrypted packet into the second virtual private network from the first private network for delivery to the second destination node.

11. The method of claim 10, further comprising:

receiving the group-encrypted packet at the first destination node of the first private network;

authenticating the group-encrypted packet based on the identifiers in the security-encapsulating header;

extracting the encrypted-subnet packet from the group-encrypted packet;

obtaining the first packet from the encrypted-subnet packet; and transmitting the first packet to the second destination node.

12. The method of claim 11, further comprising:
receiving the first packet at the second destination node; and
obtaining the first payload of the first packet and the second payload of the second packet.

13. The method of claim 10, wherein encrypting comprises encrypting the first packet with a security association for securing the first packet using a cipher, wherein the cipher is pre-negotiated to be associated to (i) a security credential established by at least one node of the second network and (ii) an indicator that indicates that the second source node and the second destination node belong to the first private network.

14. The method of claim 13, wherein encrypting comprises encrypting the second IP header with a security association for authenticating the second source node.

15. The method of claim 13, wherein encrypting comprises encrypting the second IP header with the security association that comprises a token used for authenticating the group-encrypted packet by the tunneling protocol.

16. The method of claim 15, wherein encrypting comprises encrypting the second IP header using the token that is based on (i) a time system maintained by the first destination node, and (ii) a shared secret maintained by the first destination node.

17. The method of claim 15, wherein encrypting comprises encrypting the second IP header using the token that is based on (i) a time system maintained by the first source node, and (ii) a shared secret maintained by the first source node.

18. The method of claim 10, further comprising at the first source node and the first destination node of the first private network, initiating negotiations for secure transmission of the group-encrypted packet to the second virtual private network.

19. A method comprising:
obtaining a first packet that includes a first Internet Protocol (IP) header and a first payload, wherein the first IP header includes a first source address of a first source node of a first private network and a first destination address of a first destination node of the first network, the first payload includes a second packet that has a second IP header and a second payload, the second IP header having a second source address of a second source node of a second virtual private network partitioned from resources of, formed over, established within or via, the first private network and a second destination address of a second destination node of the second network;
encrypting the second packet to form a first encrypted-subnet packet;
encapsulating the first encrypted-subnet packet with a first group-security association formed in accordance with a first group-security policy to form a first group-encrypted packet using a tunneling protocol for tunneling the group-encrypted packet between the first source node of the first network and the first destination node of the first private network such that only the first source node of the first private network and the first destination node of the first private network are able to decipher the encrypted-subnet packet that is encapsulated in the group-encrypted packet with a message-authentication code identified for the encrypted-subnet packet, wherein the first encrypted-subnet packet comprises a security-encapsulating header configured with identifiers of the first source node, the first destination node, the second source node, and the second destination node;
encrypting the first group-encrypted packet to form a second encrypted-subnet packet;
encapsulating the second encrypted-subnet packet with a second group-security association formed in accordance with a second group-security policy to form a second group-encrypted packet using a tunneling protocol for tunneling the second group-encrypted packet between the second source node of the second private network and the second destination node of the second virtual private network such that only the second source node of the second virtual private network and the second destination node of the second virtual private network are able to decipher the second encrypted-subnet packet that is encapsulated in the second group-encrypted packet with a message-authentication code identified for the second encrypted-subnet packet, wherein the second encrypted-subnet packet comprises a security-encapsulating header configured with identifiers of the second source node, the second destination node, the second source node, and the second destination node;
replicating the first group-encrypted packet at the first source node of the first private network such that the first group-encrypted packet follows a multicast distribution tree in the first private network;
transmitting the second group-encrypted packet for delivery to the second destination node of the second virtual private network.

20. The method of claim 19, further comprising:
receiving the second group-encrypted packet at the second destination node of the second virtual private network;
authenticating the second group-encrypted packet based on identifiers in a security-encapsulating header of the second group-encrypted packet;
extracting the second encrypted-subnet packet from the second group-encrypted packet;
obtaining the first group-encrypted packet from the second encrypted-subnet packet; and
transmitting the first group-encrypted packet to an intermediate node between the first private network and second virtual private network.

21. The method of claim 20, further comprising:
receiving the first group-encrypted packet at the intermediate node;
authenticating the first group-encrypted packet from identifiers in a security-encapsulating header of the first group-encrypted packet;
extracting the first encrypted-subnet packet from the first group-encrypted packet;
obtaining the first packet from the first encrypted-subnet packet; and
transmitting the first packet to the first destination node.

22. The method of claim 21, further comprising:
receiving the first packet at the first destination node; and
obtaining the first payload of the first packet and the second payload of the second packet.

23. The method of claim 19, further comprising at the first source node and the first destination node of the first private network, initiating negotiations for secure transmission of the group-encrypted packet to the second virtual private network.

* * * * *

UNITED STATES PATENT AND TRADEMARK OFFICE
CERTIFICATE OF CORRECTION

PATENT NO. : 8,036,221 B2  Page 1 of 1
APPLICATION NO. : 12/210821
DATED : October 11, 2011
INVENTOR(S) : Scott Fluhrer et al.

It is certified that error appears in the above-identified patent and that said Letters Patent is hereby corrected as shown below:

On the Title page of the patent, (75) Inventors: replace "Haseeb Naizi" with -- Haseeb Niazi --.

Signed and Sealed this
Twenty-seventh Day of December, 2011

David J. Kappos
*Director of the United States Patent and Trademark Office*